2,981,230
Patented Apr. 25, 1961

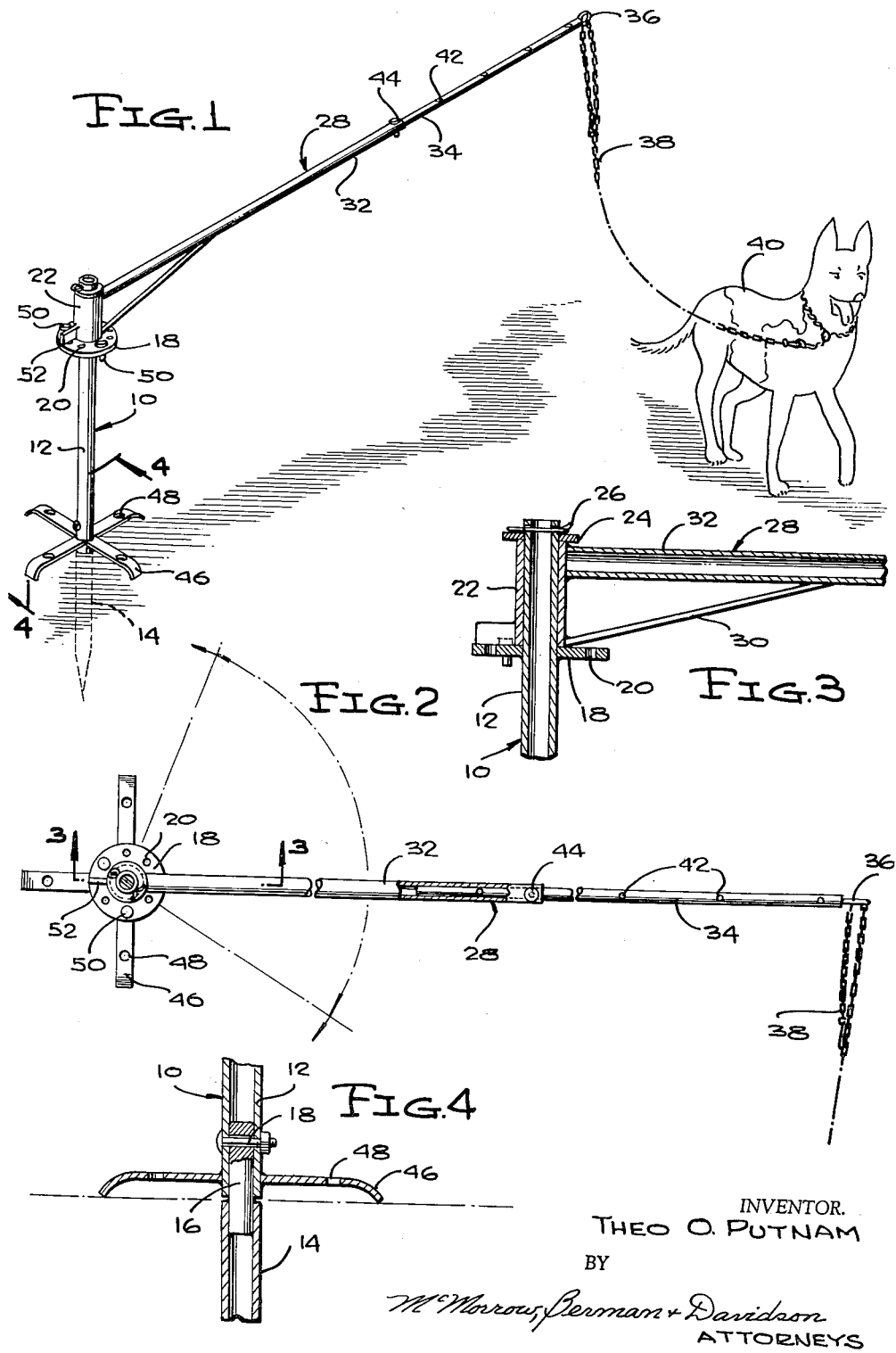

2,981,230

ANIMAL TETHER ASSEMBLY

Theo O. Putnam, Fringer Road, Upperco, Md.

Filed Nov. 7, 1958, Ser. No. 772,439

2 Claims. (Cl. 119—117)

The present invention relates to a device for tethering a domestic animal.

An object of the present invention is to provide an animal tether assembly which lends itself to ready erection on a natural ground surface or on a paved surface.

Another object of the present invention is to provide an animal tether assembly which enables an animal owner to tether the animal in such a manner that the animal is prevented from becoming entangled in the tethering rope or chain.

A further object of the present invention is to provide an animal tether assembly which normally permits the tethered animal to have a full circular area for exercise but which may be adjusted so that the animal is held within a predetermined portion of such area.

A still further object of the present invention is to provide an animal tether assembly which is sturdy in construction, one simple in structure, easily fabricated and assembled, and one which is economically feasible.

These and other objects and advantages of the present invention will be fully apparent from the following description when taken in conjunction with the annexed drawing, in which:

Figure 1 is an isometric view of the assembly of the present invention shown in a condition of use with an animal tethered to the assembly;

Figure 2 is a top plan view of the assembly shown in Figure 1;

Figure 3 is a view on an enlarged scale, taken on the line 3—3 of Figure 2; and

Figure 4 is a view on an enlarged scale, taken on the line 4—4 of Figure 1.

Referring in greater detail to the drawing in which like numerals indicate like parts throughout the several views, the animal tether assembly according to the present invention comprises a standard 10 having an upper section 12 and a lower section 14 secured together by means of a pin (Figure 4) which is fixedly secured in the upper end of the lower section 14 and projects upwardly therefrom, such pin being designated by the numeral 16. The pin 16 is provided with a transversely arranged hole in its upper end portion through which extends the shank of a bolt and nut assembly 18 for securing the pin 16 within the lower end portion of the standard upper section 12.

The lower end portion of the lower section 14 of the standard 10 is brought to a point, as shown in Figure 1, so that it may be easily driven into a ground surface for support of the standard 10 in an upright direction.

A horizontally disposed collar 18 is circumposed about and secured to the standard 10 at a point spaced inwardly of the upper end of the upper section 12. The collar is provided with a series of spaced holes 20 extending thereabout.

An upstanding sleeve 22 is rotatably and slidably mounted upon the portion of the standard upper section 12 above the collar 18. The sleeve 22 is supported on the collar 18 for rotary movement about the adjacent portion of the standard 10.

A washer 24 rests upon the upper end of the sleeve 22 and a cotter pin 26 extends through opposed holes in the upper end portion of the standard section 12 above the washer 24, and with the washer 24, serves to retain the sleeve 22 upon the standard section 12.

A horizontally disposed arm 28 has one end fixedly secured by welding or other means to the portion of the sleeve 22 adjacent the upper end of the latter. The arm 28 projects out horizontally and a brace member 30 is welded to the underside of the arm 28 at a point spaced from the sleeve 22 and is welded to the sleeve 22 at the lower end of the latter.

The arm 28 is formed of two telescopingly arranged sections 32 and 34 with the one end of the section 32 fixedly secured to the sleeve 22 for movement therewith. The end of the section 34 remote from the standard 12 carries an eye formation 36 through which is passed an intermediate portion of a rope or chain 38 serving as a tether for the animal 40 shown in Figure 1.

The arm section 34 telescopes within the section 32 and there is provided cooperating releasable latch means on the sections 32 and 34 for holding the section 34 in any position of its telescoped movement into and out of the section 32. This means consists in a plurality of spaced holes 42 in the arm section 34 and a locking pin 44 extending through any one of the selected holes 42 and holes provided in the portion of the arm section 32 adjacent the end.

A support member 46, of cruciform conformation, is secured by welding or other means to the lower end portion of the standard section 12 and engages the top of the ground when the standard lower end section 14 is driven into the ground. The support member 46 is provided with a hole 48 in each of its legs by means of which bolts may be used to attach the support member 46 to a solid paved surface when it is impossible to use the standard section 14.

Lost-motion stop means is provided for limiting the rotary movement of the sleve 22. Such means embodies a pair of bolts 50 which are inserted in selected ones of the holes 20 in the collar 18 so that their heads are engaged by an abutment 52 projecting outwardly from the sleeve 22 adjacent the lower end of the latter and on the side of the sleeve 22 opposed from the arm 28. The engagement of the abutment 52 with the bolt heads of the bolts 50 limits the swinging movement of the arm 28 so that the animal 40 is restricted in its movements as desired. The dotted lines in Figure 2 indicate the swinging movement of the arm 28 when restricted by the bolts 50.

In use, the animal tether assembly of the present invention is erected with ease and facility on either a ground surface into which the lower standard section 14 may be driven or with the lower section 14 removed, the support member 46 may be bolted to a paved ground surface. The sections 32 and 34 are telescoped together readily and the tether 38 adjusted in length so that the animal 40 cannot reach the standard 10 and entangle himself in his tether 38 around the standard 10.

What is claimed is:

1. An animal tether assembly comprising a standard having the lower end adapted to be mounted in a ground surface, a collar circumposed about and secured to said standard inwardly of and spaced from the upper end, an upstanding sleeve circumposed about the portion of said upper section above said collar and having the lower end rotatably supported on said collar, a horizontally-disposed arm having one end fixedly secured to said sleeve for movement therewith, a brace member extending from said arm to said sleeve and attached to said arm and sleeve, a flexible tether of a length less than said arm having one end secured to attaching means on the other end of said arm and having the other end adapted to be detachably secured to an animal to be tethered, and lost-motion stop means on said collar and sleeve for limiting the rotary movement of said sleeve.

2. An animal tether assembly according to claim 1 wherein said standard embodies a lower section adapted for mounting in a ground surface and an upper section having the lower end detachably secured to the upper end portion of said lower section, wherein said lost-motion stop means comprises at least two spaced bolts on the collar and an abutment carried by said sleeve and engageable with said bolt.

References Cited in the file of this patent

UNITED STATES PATENTS

| | | |
|---|---|---|
| 221,651 | Wright | Nov. 11, 1879 |
| 445,454 | Powell et al. | Jan. 27, 1891 |
| 601,952 | Day | Apr. 5, 1898 |
| 1,181,881 | Hausz | May 2, 1916 |
| 1,956,937 | Van Kleek | May 1, 1934 |
| 2,607,320 | Ashbaugh | Aug. 19, 1952 |

FOREIGN PATENTS

| | | |
|---|---|---|
| 453,621 | Great Britain | Sept. 15, 1936 |